United States Patent [19]

Locke et al.

[11] Patent Number: 4,622,854
[45] Date of Patent: Nov. 18, 1986

[54] ROUNDED WALL SURFACE ACOUSTIC WAVE SENSORS

[75] Inventors: Stanley Locke, Norwalk; Bikash K. Sinha, West Redding, both of Conn.; Michael P. Ekstrom, Paris, France

[73] Assignee: Schlumberger Technology Corporation, New York, N.Y.

[21] Appl. No.: 687,715

[22] Filed: Dec. 31, 1984

[51] Int. Cl.⁴ ............................................. G01L 11/00
[52] U.S. Cl. ..................................... 73/703; 29/25.35; 73/708; 73/729; 73/DIG. 4; 310/313 B; 310/338
[58] Field of Search .......... 73/703, 708, 723, DIG. 4, 73/729; 310/313 B, 338; 29/25.35

[56] References Cited

U.S. PATENT DOCUMENTS 4,361,050 11/1982 Coussot .................. 73/DIG. 4
4,535,631 8/1985 Sinha et al. ............... 73/703

Primary Examiner—Donald O. Woodiel
Attorney, Agent, or Firm—Cooper, Dunham, Griffin & Moran

[57] ABSTRACT

Disclosed is an externally loaded pressure sensor using a pair of SAW devices formed on the wall of an interior cavity. The difference frequency of these devices is used as a temperature-compensated measure of hydrostatic pressure on the sensor exterior. The cavity wall immediately adjacent the long sides of at least one of the SAW devices is rounded, to improve pressure sensitivity without unacceptable increase in stresses or other adverse effects.

27 Claims, 16 Drawing Figures

ROUNDED WALL SURFACE ACOUSTIC WAVE SENSORS

BACKGROUND AND SUMMARY OF THE INVENTION

The invention relates to sensors employing surface acoustic wave ("SAW") devices. An important aspect of the invention relates to using SAW devices to measure pressure, such as hydrostatic pressure.

Sensors employing SAW devices (such as delay lines and resonators), have been proposed for use in measuring parameters such as acceleration and pressure. SAW sensors rely on the propagation of acoustic waves in media which respond to external influences the effect of which changes SAW characteristics such as wave velocity or frequency. In one prior proposal, a SAW device is on a thin diaphragm mounted so as to flex under the external influences to be measured and thereby change the characteristics of the SAW device in a way which can be measured. Another type of a previously proposed sensor structure uses a cylindrical body as an externally loaded or an internally loaded probe. For an externally loaded structure, the body has a sealed cavity, with one or more SAW devices mounted on the interior surface. When external pressure is applied, the body flexes and changes the SAW device characteristics. For an internally loaded structure, one or more SAW devices are on the exterior surface of the cylindrical body, and outward pressure is applied at a central opening in the cylinder. A detailed description of surface acoustic wave sensors can be found in commonly assigned co-pending application Ser. No. 427,240 filed on Sept. 29, 1982, now U.S. Pat. No. 4,535,631. The entire contents of said application are hereby incorporated by reference herein, and the prior art discussed in said application is hereby brought to the attention of the Examiner herein. Improvements of such devices are disclosed in commonly owned application Ser. No. 687,716 filed concurrently herewith, the entire contents of which are hereby incorporated by reference herein, and the prior art discussed or cited in which is hereby brought to the attention of the Examiner.

One way of making externally loaded structures is to start with a solid cylinder of a material such as crystalline quartz, saw it in half along an axial plane and rout the flat sides of the halves to form channels with respective "flats" at their bottoms. (The term "flat" is used here to mean a surface which is flat enough to form a SAW device thereon; in fact, the surface can be planar or curved.) A respective SAW device is formed on each flat, and the two halves are reassembled into a cylinder and secured to each other, as by suitable bonding, to seal the internal cavity formed by the facing channels. Electrical leads from the SAW resonators run through the bond to an external circuit. This structure typically is mounted in a housing which allows the structure to be selectively subjected to external pressure, such as pressure from fluid which is selectively admitted in the housing. The change in the difference frequency of the two SAW devices, as between the steady states before and after the pressure was applied, is used as a measure of the pressure change. Examples of such structures are described in said commonly assigned, earlier-filed application.

An exemplary and nonlimiting use of structures of this type is in sensing downhole pressure in exploratory or producing oil wells. Stringent and often conflicting requirements are imposed on such structure by the severe downhole conditions, such as high pressure and temperature and the need to measure accurately very small pressure differentials. As one example, in evaluating and planning the exploitation of producing wells, it is sometimes desirable to change the producing rate of one well in a field (e.g., close off temporarily), and to measure and time the resulting pressure changes in one or more other wells in the same field, for example in order to estimate the permeability of the subsurface formations. It will be appreciated that this requires relatively minute changes in pressure to be accurately measured under the difficult downhole conditions.

Accordingly, it would be desirable for SAW pressure sensors to provide pressure measurement capabilities with a dynamic range of about a million or more, pressure response time of the order of several seconds or less over a temperature range of 0°–125° C. or more, and high accuracy. Stated differently, it is desirable to have a SAW pressure sensor having a pressure range of 0–10,000 psi, resolution of 0.01 psi, and accuracy of 0.025% full scale. It is further desirable to exceed even these goals, and provide a structure having a pressure range exceeding 0–20,000 psi, temperature range exceeding 0°–175° C. and pressure response time on the order of a few seconds, without compromising the above-mentioned resolution and accuracy.

The above-identified earlier-filed commonly assigned application discloses among other things an externally loaded SAW pressure sensor which has a cylindrical shape and an internal cavity in which two SAW resonators are formed in channels facing each other. An external circuit measures the difference frequency of the SAW resonators, and uses it as a temperature-compensated measure of the pressure on the external surface of the structure. Examples of such structures are illustrated in FIGS. 4, 5, 12, 13, 14, 15, 19, 20, 29, 30 and 33 of the commonly assigned earlier-filed application. In each of these illustrations of particular embodiments, the SAW resonator is on a flat surface (called simply a "flat") in the bottom of a channel, and the channel sides which flank the resonator flat are substantially straight and planar, except possibly for some rounding of sharp corners which are designed to relieve stresses at wall intersections. While the inventions claimed therein need not be limited to straight channel sidewalls, no figure of said earlier-filed application illustrates a curved sidewall immediately flanking the SAW device flat in an externally loaded structure.

It is believed that the structures disclosed and claimed in the earlier-filed commonly assigned application provide significant improvement over prior proposals. Still, a need remains for even greater improvements. In an effort to meet that need, it has been discovered that unexpected and highly significant improvements result from changing the structure configuration by curving or rounding the sidewall immediately flanking one or more of the respective SAW devices. These improvements include an unexpected significant increase in pressure sensitivity without significant adverse effects on stresses.

Accordingly, an exemplary and nonlimiting embodiment of the invention comprises a pressure sensor in the form of a cylindrical body made of two halves joined along an axial plane. An axially extending channel in each half faces that of the other, and has an axially extending flat at its bottom. A respective SAW device occupies each flat. At least one of the channels has a curved sidewall adjoining the flat. Preferably, but not necessarily, the curved sidewall conforms to a cylindrical surface. The curved sidewall can be formed with a routing tool having a curved or a cylindrical surface. The two channels can differ in depth, such that the wall thickness of the body can be greater at one flat than at the other, and the flats can differ in width.

In broader terms, an exemplary and nonlimiting example of the invention comprises a hollow body having at least one SAW device which is formed on its interior surface and has frequency characteristics which vary with pressure exerted on the exterior of the body, wherein at least a substantial portion of the interior surface adjoining the SAW device is curved. Preferably, the hollow body has two interior flats which are formed on the interior thereof and face each other. The SAW devices can be formed on respective interior flats.

A pressure sensitivity increase of the order of 50% is estimated for a particular embodiment having a curved sidewall adjacent one flat, as compared to a particular embodiment having planar sidewalls adjacent both flats, without significant increase in stresses at the flat centers.

These and other advantages of the invention are discussed in more detail below in connection with the exemplary embodiments shown in the figures.

DETAILED DESCRIPTION

Figure 1:
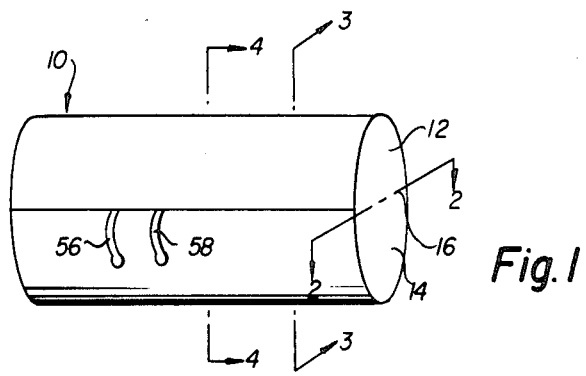
FIG. 1 is a perspective view of an externally loaded SAW device pressure sensor.
Figure 4:
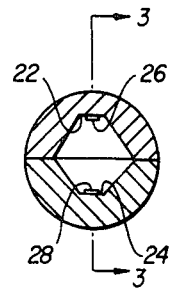
FIG. 4 is a cross-sectional view taken along line 4—4 of FIG. 1 (at a transaxial plane).
Figure 3:
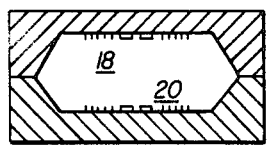
FIG. 3 is an axial sectional view taken along line 3—3 (at an axial plane perpendicular to that of FIG. 2).
Figure 2:
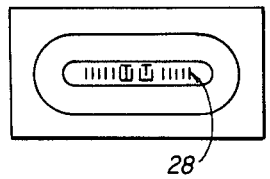
FIG. 2 is an axial sectional view taken along line 2—2 (at the axial plane at which the two halves making up the cylindrical structure of FIG. 1 are joined).
Figure 9:
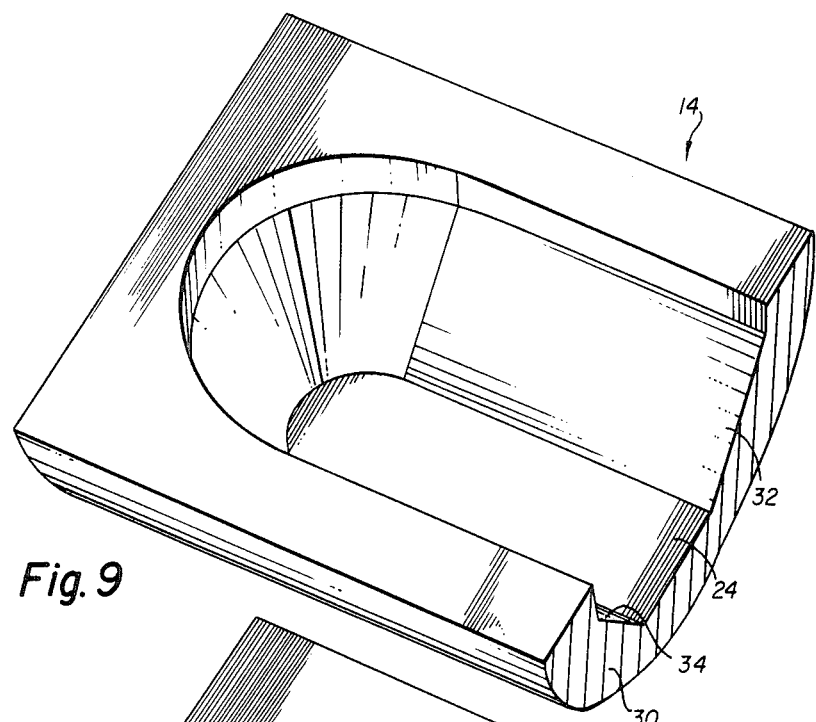
FIG. 9 is a perspective view illustrating a channel having straight sidewalls adjacent the flat.
Figure 10:
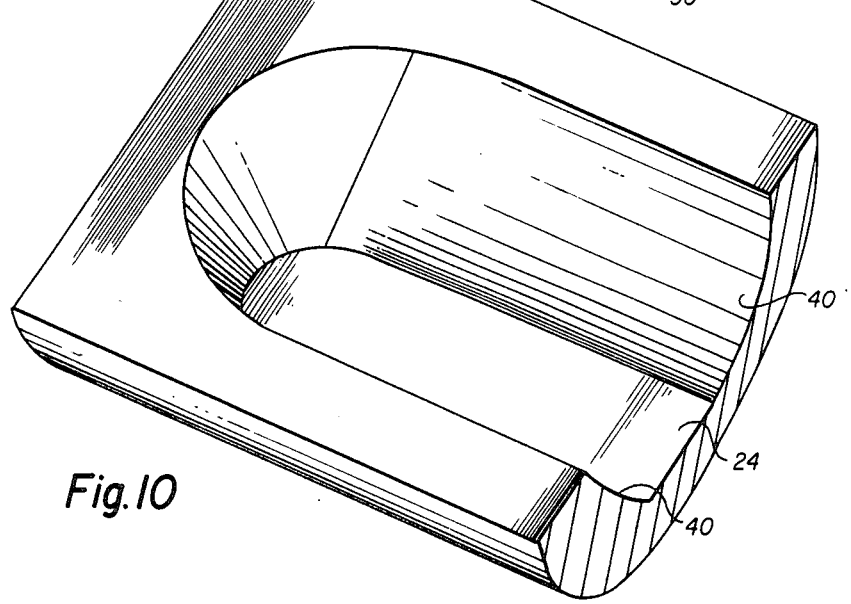
FIG. 10 is a similar perspective view illustrating a channel having a curved sidewall adjacent the flat.

Referring to the perspective view of FIG. 1 and the sectional views of FIGS. 2, 3 and 4, an externally loaded pressure sensor generally indicated at 10 comprises a top half 12 and a bottom half 14 joined at 16 along an axial plane. An axially extending channel 18 is formed in top half 12, and a similar axially extending channel 20 is formed in bottom half 14. The two channels face each other, and together form a cavity sealed by the top and bottom halves 12 and 14. An axially extending top flat 22 is formed at the bottom of top channel 18, and an axially extending bottom flat 24 is formed at the bottom of channel 20. Flats 22 and 24 face each other across the cavity formed by channels 18 and 20. A top SAW resonator 26 is formed on top flat 22, and a bottom resonator 28 is formed on bottom flat 24. Additional detail of the appearance of the halves making up body 10 can be gleaned from FIG. 9 which shows a perspective view of one-half of bottom half 14, the other part being substantially symmetrical with respect to the plane 30 along which bottom half 14 is cut in the view of FIG. 9. The term "substantially" is used here because, as best seen in FIG. 4, the two channels can differ in depth, and the wall thicknesses at the two flats can differ. As seen in FIG. 9, bottom flat 24 is flanked on its long sides by straight (planar) sidewalls 32 and 34. It can be formed (fabricated) by routing a half of a solid cylinder cut along an axial plane with a routing tool shaped in the form of a truncated cone. Top half 12 can be similarly shaped, but channels 18 and 20 can differ in depth. When channels 18 and 20 differ in depth, the top thickness (the thickness of the sensor body wall above top flat 22) can be different from the bottom thickness (the thickness of the sensor body wall below bottom flat 24). In the embodiment of FIGS. 2-4, which contains a nonlimiting example of dimensions, the top thickness is 4 millimeters and the bottom thickness 6 millimeters. In a FIG. 5, which contains another nonlimiting example of selected dimensions, the top thickness is 5.79 millimeters and the bottom thickness is 3.17 millimeters. In each of these examples the facing flats of a given sensor have the same widths (5 millimeters in FIGS. 2-4, and 6.350 millimeters in FIG. 5). However, this need not be the case, and the flats of the same sensor can differ in width from each other.

Pressure sensors having straight (planar) walls adjacent the flats, such as illustrated in FIGS. 2-4, 5 and 9, are estimated to give highly useful results in terms of pressure sensitivity and stresses at the flat centers. For example, the sensor embodiment illustrated in FIG. 5, which differs from that illustrated in FIGS. 2-5 only in the indicated difference in measurements, gives estimated pressure sensitivity (at the flat centers) as specified in Table 1 below. In Table 1, the estimated parameter is change in SAW resonator frequency per unit change in externally applied hydrostatic pressure (Hz/psi). The column labelled t identifies the thickness of the sensor wall at the thick and the thin flats respectively. The column labelled t/r identifies the ratio between the thickness dimension given in the preceding column and the radius of the sensor body. The column labelled ST gives the estimated change in frequency of the respective SAW device per unit change in externally applied pressure in units of Hz/psi for an ST cut sensor. The column labelled AT gives the change in frequency per unit change in externally applied pressure for an AT cut sensor. The reference oscillator frequency for the estimates of pressure sensitivities in Table 1 is 310 MHz. Examples of techniques for applying external pressure are discussed in connection with FIG. 14 below, and examples of techniques for measuring SAW device frequency are discussed in connection with FIGS. 11–13b below, as well as in said earlier-filed application.

TABLE 1

|  | t (mm) | t/r | ST (Hz/psi) | AT (Hz/psi) |
|---|---|---|---|---|
| Δf/ΔP | 5.79 | 0.456 | 38.0 | 20.0 |
| Δf/ΔP | 3.17 | 0.250 | 50.0 | 28.4 |

While the embodiments using straight (planar) sides flanking the flats, as in FIGS. 2–4, 5 and 9, give good estimated results as compared with prior proposals, it has been discovered that rounding the sidewall flanking at least one of the flats, gives unexpectedly improved results, and that the unexpected improvement is highly significant and is not accompanied by an increase in stresses which would degrade sensor performance.

Figure 5:
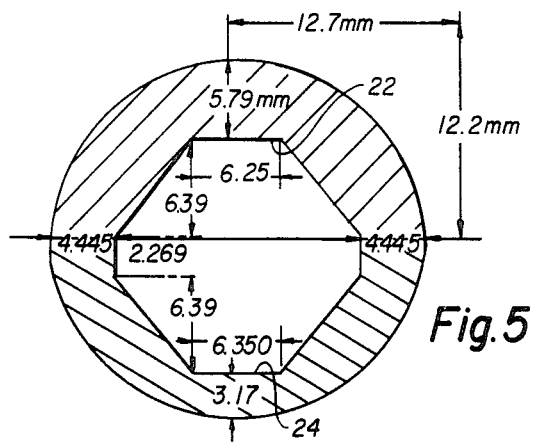
FIG. 5 is a transaxial sectional view similar to that of FIG. 4 but illustrating an embodiment using planar sidewalls adjacent the flats.
Figure 6:
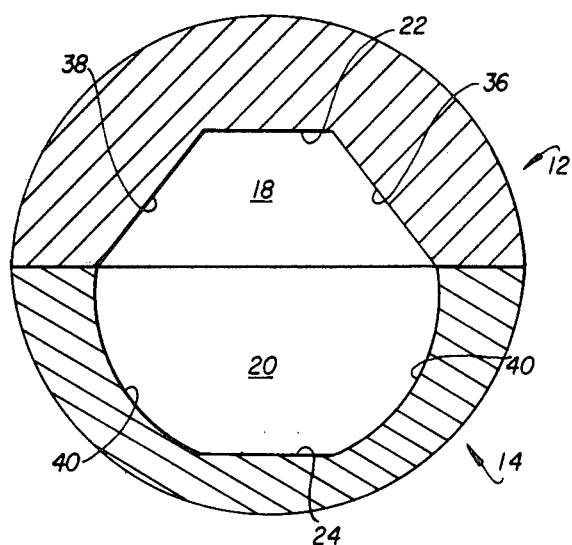
FIG. 6 is a transaxial sectional view showing an embodiment using a curved sidewall adjacent the bottom flat.

Referring as one example to FIG. 6, it is seen that top flat 22 (the thick flat) is flanked by straight sidewalls 36 and 38, as in the embodiment of FIG. 5, but bottom flat 24 (the thin flat) is flanked by a curved sidewall 40 on both the right and the left sides. Bottom channel 20, which has the curved sidewall 40, can be formed in substantially the same manner as top channel 18—e.g., with a routing tool. However, the routing tool for bottom channel 20 has a bottom end which is in the shape of a hemisphere which has a flattened bottom section (to form bottom flat 24). Referring to FIG. 9 for a perspective view illustrating a sensor half having a round sidewall device, it is seen that it differs from the illustration in FIG. 9 only in that it has a curved sidewall 40 flanking the long sides of bottom flat 24.

The sensor structure illustrated in FIG. 6 is labelled BR, shorthand for Bottom Round, to indicate that only the bottom channel 20 has a round or curved sidewall 40.

Figure 7:
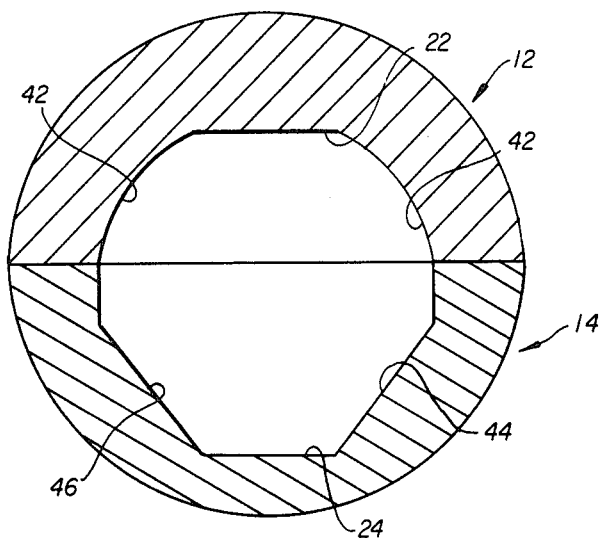
FIG. 7 is a transaxial sectional view showing an embodiment using a curved surface adjacent the top flat.

Another embodiment using a curved sidewall is illustrated in FIG. 7 and is labelled TR, short for Top Round. In FIG. 7, the top (or thick) flat 22 is flanked by a curved sidewall 42 on each of its long sides, while the bottom flat 24 is flanked by straight walls 44 and 46, as in the embodiments of FIGS. 2–5 and 9.

Figure 8:
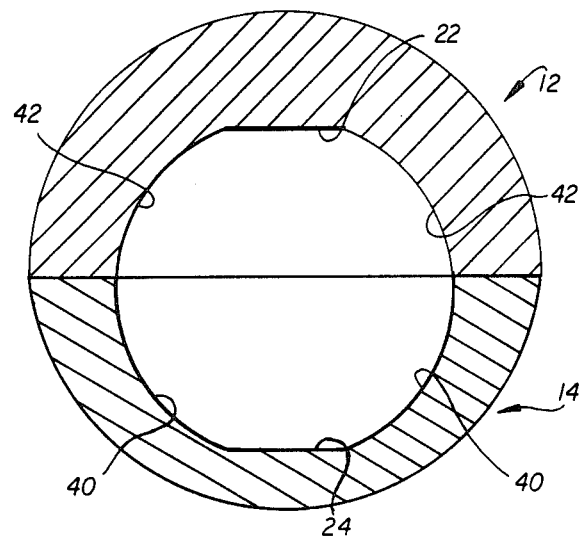
FIG. 8 is a transaxial sectional view illustrating an embodiment using curved sidewalls adjacent both the top and the bottom flats.

FIG. 8 illustrates yet another embodiment, labelled TBR, short for Top and Bottom Round. In the embodiment of FIG. 8 the bottom (or thin) flat 24 is flanked by a round sidewall 40, as in the embodiment of FIG. 6, and the top (or thick) flat 22 is flanked by a round sidewall 42, as in the embodiment of FIG. 7.

It has been discovered that, unexpectedly, the use of a round sidewall flanking at least one flat, brings about startling estimated improvements in pressure sensitivity, and that this does not degrade sensor performance by unacceptably increasing the stresses at the flat centers. Table 2 below gives the estimated pressure sensitivities at the flat centers, using the same notation as Table 1 above, and repeats the contents of Table 1 (for the pressure sensor illustrated in FIG. 5) for more convenient comparison with the estimated results thereof with those for the sensors of FIG. 8 (TBR), of FIG. 7 (TR), and of FIG. 6 (BR). As in Table 1, the values in the ST and AT columns are the estimated changes in SAW device frequency per unit change in externally applied pressure (in Hz/psi).

TABLE 2

|  | t (mm) | t/r | ST (Hz/psi) | AT (Hz/psi) |
|---|---|---|---|---|
| FIG. 5 |  |  |  |  |
| Δf/ΔP | 5.79 | 0.456 | 38.0 | 20.0 |
| Δf/ΔP | 3.17 | 0.250 | 50.0 | 28.4 |
| TBR (FIG. 8) |  |  |  |  |
| Δf/ΔP | 5.79 | 0.456 | 38.9 | 24.8 |
| Δf/ΔP | 3.17 | 0.250 | 54.7 | 39.2 |
| TR (FIG. 7) |  |  |  |  |
| Δf/ΔP | 5.79 | 0.456 | 39.1 | 25.4 |
| Δf/ΔP | 3.17 | 0.250 | 50.5 | 27.1 |
| BR (FIG. 6) |  |  |  |  |
| Δf/ΔP | 5.79 | 0.456 | 37.9 | 19.6 |
| Δf/ΔP | 3.17 | 0.250 | 54.2 | 41.6 |

It is seen in Table 2 that the changes in SAW device frequency per unit change in pressure for the two flats of sensor BR (FIG. 6) have the largest contrast, and that this holds true for both the ST and the AT cut. With straight (planar) sidewalls adjacent both flats, as in FIG. 5, the estimated differential pressure sensitivity is 12 Hz/psi for the ST cut. This changes to 15.8 for the TBR sensor of FIG. 8, where both the top and the bottom flats are flanked by the curved (spherical) sidewalls, and to 16.3 for the BR sensor of FIG. 6, where the bottom flat is flanked by a curved sidewall and the top flat is flanked by straight sidewalls. Similar improvement in estimated differential pressure sensitivity is noted for the AT cut: 8.4 for the sensor with straight sidewalls adjacent both flats (as in FIG. 5), 14.4 for the TBR sensor of FIG. 8 (with curved sidewalls adjacent both flats), and 22 for the BR sensor of FIG. 6 (with a curved sidewall adjacent the bottom flat and straight sidewalls adjacent the top flat). For the ST cut, a decrease in differential sensitivity as compared with the sensor of FIG. 5 (having straight walls adjacent both flats), is noted for the TR sensor of FIG. 7 (having a curved sidewall adjacent the top flat and straight sidewalls adjacent the bottom flat), but a very substantial increase in sensitivity is noted for the BR sensor of FIG. 6. It can be further estimated from these results that a sensor made from a crystal cut so that the flats are between an ST cut and an AT cut, should show an improvement in differential sensitivity of the order of 50% for the BR configuration as compared to a configuration such as in FIGS. 2–5 and 9.

The unexpected and startling increase in estimated pressure sensitivity brought about by rounding the sidewall adjacent to at least one of the flats, comes without significant concomitant increase in stresses at the centers of the flats, as is evident from the estimated results given in Table 3 for the configuration illustrated in FIG. 5 as compared to other configurations discussed in connection with Table 2. The stress, sigma, is given for the zz direction, which is the axial direction (along the cylindrical axis) and for the theta-theta direction, which is the hoop stress direction. In each case the stress is per psi of externally applied pressure. The remaining notation in Table 3 is the same as in Table 2. Unexpectedly, despite the thinner sensor body wall associated with the curved sidewall, there is no significant increase in stresses for either the ST or the AT cut. Thus, no significant sacrifice in strength of the sensor is made in order to secure the startling increase in estimated pressure sensitivity.

TABLE 3

|  | t (mm) | t/r | ST | AT |
|---|---|---|---|---|
| axial stress | 5.79 | 0.456 | −1.66 | −1.62 |
| hoop stress | 5.79 | 0.456 | −2.26 | −2.25 |
| axial stress | 3.17 | 0.250 | −2.16 | −2.13 |
| hoop stress | 3.17 | 0.250 | −2.88 | −2.84 |
| TBR |  |  |  |  |
| axial stress | 5.79 | 0.456 | −1.59 | −1.57 |
| hoop stress | 5.79 | 0.456 | −1.90 | −1.87 |
| axial stress | 3.17 | 0.250 | −2.06 | −2.03 |
| axial stress | 3.17 | 0.250 | −2.00 | −2.00 |
| TR |  |  |  |  |
| axial stress | 5.79 | 0.456 | −1.57 | −1.54 |
| hoop stress | 5.79 | 0.456 | −1.80 | −1.77 |
| axial stress | 3.17 | 0.250 | −2.23 | −2.20 |
| hoop stress | 3.17 | 0.250 | −3.09 | −3.06 |
| BR |  |  |  |  |
| axial stress | 5.79 | 0.456 | −1.68 | −1.65 |
| hoop stress | 5.79 | 0.456 | −2.35 | −2.34 |
| axial stress | 3.17 | 0.250 | −1.99 | −1.96 |
| hoop stress | 3.17 | 0.250 | −1.79 | −1.72 |

Figure 11:
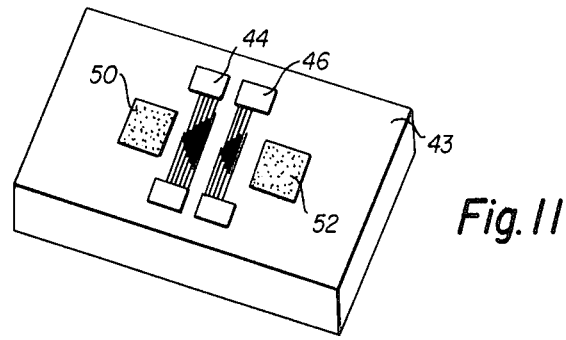
FIG. 11 is a perspective view illustrating major components of a SAW resonator.

Each of resonators 26 and 28 can be of the type illustrated in FIG. 11, and can comprise surface wave interdigital transducers 44 and 46 deposited on the highly polished surface 48 of the respective flat, and surface wave grating reflectors 50 and 52 formed on the surface of the respective flat, in accordance with known technology and as discussed in said 1982 application. The surface wave propagates along the long dimension of the flat and parallel to the cylinder axis of sensor body 10.

Figure 12:
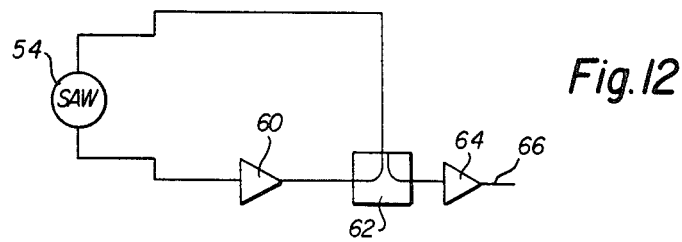
FIG. 12 is a block diagram illustrating major components of a SAW resonator and an external circuit therefor.

Referring to FIG. 12, which is a simplified block diagram of a SAW resonator of the type illustrated in FIG. 11 and of the circuitry for driving it and for providing an output, a SAW resonator is schematically illustrated at 54 and has outputs connected via leads such as 56 and 58 in FIG. 1. The leads pass through the sealed joint between top and bottom halves 12 and 14, and can be suitably connected to an external circuit board. As shown in FIG. 12, the external circuit board can include a loop amplifier 60, a directional coupler or power splitter 62 and an output buffer amplifier 64 which provides, at an output line 66, a signal at a frequency determined by the properties of SAW resonator 54. These properties in turn depend on changes due to applied pressure on the sensor body.

Figure 13A:
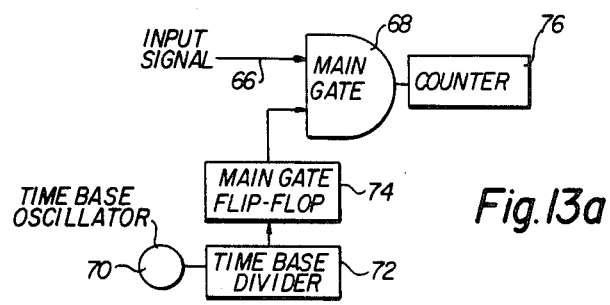
FIG. 13a is a block diagram illustrating a technique for direct counting of a SAW oscillator frequency.
Figure 13B:
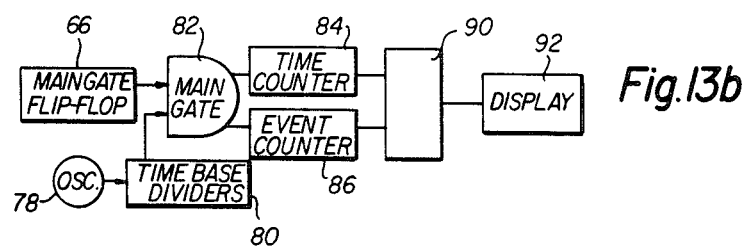
FIG. 13b is a block diagram of a period measurement technique for measuring a SAW oscillator frequency.

FIGS. 13a and 13b illustrate two known methods of measuring the frequency of the output signal of a circuit such as illustrated in FIG. 12. In the direct counting method of FIG. 13a one input signal to main gate 68 is the output 66 of output buffer amplifier 64 in FIG. 12. The other input of main gate 16 comes from a time base oscillator 70 whose output is time-base divided by divider 72 and fed to main gate 68 through main gate flip flop 64. The output of main gate 68 is counted in counter 76. In operation, counter 76 counts the number of cycles of the input signal 66 allowed through main gate 68 in a time interval determined by the time base oscillator/divider and main gate flip flop. In a period measurement circuit of the type shown in FIG. 13b, the input signal such as the output 66 of output buffer amplifier 64 in FIG. 12, opens a main gate 82 for a number of input cycles N(i), and the number of cycles of the time base n(t) is counted. The time base comes from a time base oscillator 78 whose output passes through time base dividers 80 before becoming the second input to main gate 82. The frequency of input signal 66 is computed from the ratio of input cycles N(i) to the product of the number of cycles of the time base n(t) multiplied by the period t(c) of the time base. In essence, what is measured is the number of periods of the time base required to allow a number of input cycles to pass the main gate. The time per input cycle (the period of the signal) is calculated, and then its reciprocal is computed to give the measured frequency. The number of time base cycles is counted in time counter 84, and the number of input cycles is counted in event counter 86. The required product and ratio are found in arithmetic circuits 90 and the result is displayed at display 92.

Figure 14:
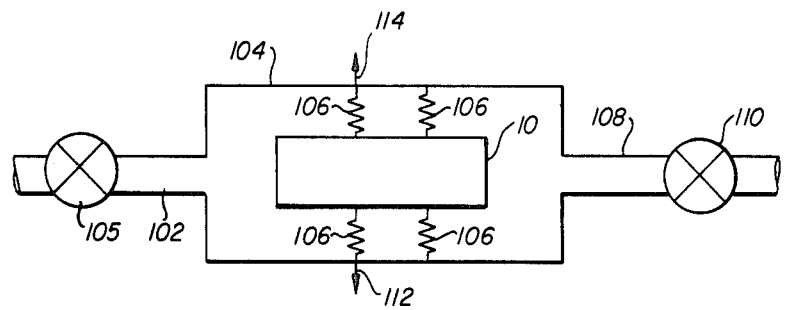
FIG. 14 is a schematic illustration of a housing in which an externally loaded SAW structure is mounted for hydrostatic pressure measurements.

An exemplary arrangement for using a sensor 10 for hydrostatic pressure measurements is illustrated in FIG. 14. It comprises an input valve 100 which can selectively open a conduit 102 to supply fluid under pressure to a housing 104 in which a pressure sensor 10 is suitably supported by isolation supports 106. The electrical connections to sensor 10 are through leads 112 and 114 connected to external circuits for measuring the frequency of SAW devices in sensor 10, such as circuits of the type discussed in connection with FIGS. 13a and 13b. The pressure within housing 104 can be relieved by evacuating the fluid therein through an outlet conduit 108 controlled by output valve 110. As an alternative, only one port can be provided, and the sensor body can be mounted by means of a resilient support extending along the cylindrical axis of the sensor body, with the electrical leads leaving the housing through the wall opposite that through which liquid is admitted in the housing. Because any of a number of different housings can be used, and because what is important is the presence of a housing rather than the particular details thereof, it is believed that no further description of a particular housing is needed to make and use the claimed invention.

Figure 14A:
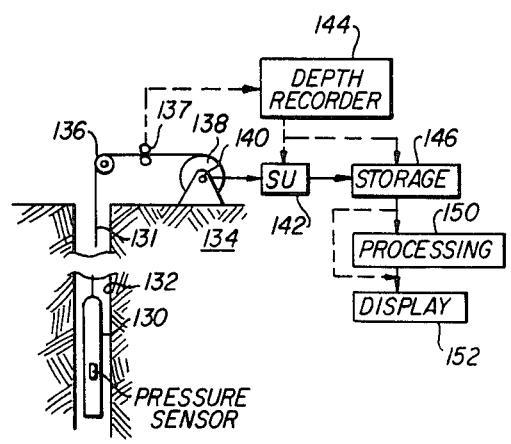
FIG. 14a illustrates the use of a sensor in well logging.

FIG. 14a illustrates the incorporation of a sensor of the type described here in a logging tool system. A sensor of the type described in connection with FIGS. 1–10 and 15 is secured in a housing such as described in connection with FIG. 14 and is mounted in a logging tool 130, which is supported by cable 131 in borehole 132 drilled in subsurface formation 134. Cable 131 passes over a sheave wheel 136 and is secured to a drum-and-winch mechanism 138. Mechanism 138 includes a suitable brush and slip-ring arrangement 140 for providing electrical connections between electrical conductors in cable 131 and a surface unit 142 which supplies power and control signals to logging tool 130 and the sensor mounted therein. A circuit such as discussed in connection with FIGS. 12–13b can be mounted inside tool 130 and operated under the control of surface unit 142 to send up, through cable 131, signals indicative of the pressure measured by the sensor. If desired, a code converter can be included in tool 130 to convert the sensor output to a digital signal in a desired code and format. A wheel 137 engages cable 131 and is linked with a depth recorder 144, which records the borehole depth at which a given pressure measurement is taken. A storage 146 receives the pressure measurements from surface unit 142 and the corresponding depth measurements from depth recorder 144, and stores them for future use. These measurements can be processed in unit 150, for example to filter out noise or other undesired signal components. The pressure/depth measurements can be displayed at unit 152 either before or after processing at 150.

The invented sensors having a curved wall adjacent a SAW device (as in FIGS. 6–8) can be fabricated using substantially the same techniques used in the case of the sensors described in said earlier-filed application. The differences of substance are those related to forming the needed curved sidewall(s). As noted, one exemplary way to do this is to use a routing tool which is not cone-shaped, as in the earlier-filed application, but is spherical or has an otherwise curved cutting surface, depending on the desired curvature of the sidewall adjacent the particular SAW device. For example, the sidewall adjacent the long sides of a flat can be parabolic, or can have some other curvature in transaxial section, so long as the desired result is achieved of improved pressure sensitivity without unacceptable degrading in terms of increased stresses. It should be appreciated that while in the illustrated embodiments the SAW devices are shown formed on the planar bottoms of the grooves, and the term "flat" has been used, it is within the scope of this invention to form at least one of the SAW devices on a curved interior surface. For example, at least one of the channels can be continuously curved in transaxial section, and the SAW device can be formed on the curved bottom portion thereof rather than on a planar surface, as in the drawings discussed above. Thus, the term "flat" is used in this application to mean the surface on which the SAW device is formed, which surface can be flat or curved or partly flat and partly curved. In addition, it should be appreciated that while in the drawings discussed above the SAW devices extend along the axial direction, it can be advantageous in some cases to have the SAW device extend along a direction which is at an angle with the cylindrical axis of the sensor body, and that this is within the scope of this invention. It should be clear that directional terms such as top, bottom and left and right refer to a particular orientation of a sensor, and are not meant as a limitation on the way in which the sensor can be oriented in actual use. Numerous variations other than those expressly discussed above are within the scope of the invention; accordingly, the invention is not limited to the specific examples discussed above, but includes all subject matter encompassed by the appended claims.

We claim:

1. A pressure sensor comprising:
   a cylindrical body made of two halves joined along an axial plane;
   an axially extending channel formed in each half to face that of the other, each channel having a bottom;
   an axially extending flat formed at the bottom of each channel; and
   a respective SAW device formed on each flat;
   wherein at least one of the channels has a curved sidewall adjacent the flat, and wherein the two channels form a sealed cavity.

2. A pressure sensor as in claim 1 in which only one of the channels has a curved sidewall adjacent the flat.

3. A pressure sensor as in claim 2 in which the wall of the body at one flat is thicker in cross-section than at the other.

4. A pressure sensor as in claim 3 in which there is a curved sidewall adjacent the flat at the body wall having the thinner cross-section.

5. A pressure sensor as in claim 1 in which each of the two channels has a curved sidewall.

6. A pressure sensor as in claim 5 in which the wall of the body at one flat is thicker in cross-section than at the other.

7. A pressure sensor as in claim 1 in which said curved sidewall is cylindrical in cross-section.

8. A pressure sensor as in claim 1 in which said curved sidewall is formed with a routing tool having a curved side surface.

9. A pressure sensor as in claim 1 including means for deriving from said SAW devices an output signal related to the difference frequency thereof.

10. A pressure sensor as in claim 9 including means for causing pressure to be exerted on the exterior of the sensor body and means for converting the output signal to a measure of said pressure.

11. A pressure sensor as in claim 1 in which the body is made of quartz crystal.

12. A pressure sensor as in claim 1 in which the flats are parallel to the axial plane separating the two halves.

13. A pressure sensor as in claim 1 in which the channels differ in depth.

14. A pressure sensor as in claim 13 in which the wall thickness of the body at one flat is greater than at the other.

15. A pressure sensor as in claim 14 in which the flats differ in width.

16. A pressure sensor comprising:
    a cylindrical body made of two halves joined along an axial plane;
    an axially extending channel formed in each half to face that of the other, each channel having a bottom and sidewalls;
    an axially extending flat formed at the bottom of each channel; and
    a respective SAW device formed on each flat;
    wherein the channel sidewalls adjacent at least one flat slope away therefrom at an angle significantly greater than normal, and wherein the two channels form a sealed cavity.

17. A pressure sensor as in claim 16 in which only a selected one of the flats is adjoined by sidewalls sloping away therefrom at angles significantly greater than normal.

18. A pressure sensor as in claim 17 in which the body is thicker in cross-section at one flat as compared with the cross-sectional thickness at the other flat.

19. A pressure sensor as in claim 18 in which the selected flat is where the body is thinner in cross-section.

20. A pressure sensor as in claim 16 in which the respective channel sidewalls adjacent each of the flats slope away from the respective flat at angles significantly greater than normal.

21. A pressure sensor as in claim 16 in which the sidewalls sloping away at angles significantly greater than normal are curved.

22. A pressure sensor comprising:
    a cylindrical body enclosing a sealed cavity;
    two elongated flats formed on the interior of the body to face each other across the cavity, wherein each flat has long sides and short sides;
    at least one SAW device formed on each flat;
    wherein the body is made of a material which deforms under pressure to change the frequency characteristics of the SAW devices; and
    wherein the interior surface of the body which connects the long sides of the flats is curved along at least about a half of its cross-section.

23. A pressure sensor comprising:
    a hollow body having a sealed cavity defined by a cavity wall, and at least two flats on the cavity wall and respective SAW devices on said flats whose frequency characteristics vary with pressure exerted on the exterior of the body;

wherein the cavity wall adjoining at least one flat curves away from the sides of the flat which are along the SAW propagation direction.

24. A pressure sensor comprising:

a sealed hollow body having an interior surface and an exterior surface and at least one SAW device which is formed on the interior surface and has a frequency characteristic which varies with pressure exerted on the exterior surface;

wherein the interior surface adjacent at least two sides of the SAW device is curved when viewed in a section normal to said sides.

25. A pressure sensor as in claim 24 including means for applying pressure to the exterior of the sensor body, for measuring frequency changes in the SAW devices and for estimating the applied pressure by using the measured frequency changes.

26. A method of measuring hydrostatic pressure comprising the steps of:

providing a sensor having a body enclosing a sealed cavity defined by a cavity wall, and at least two SAW devices formed on elongated flats on the cavity wall which are spaced from each other along the cavity wall, wherein the cavity wall adjacent the long sides of at least one of the flats is curved;

applying said hydrostatic pressure to the exterior of the sensor body; and measuring frequency changes of said SAW devices and estimating said pressure on the basis thereof.

27. A pressure sensor system comprising:

a pressure sensor comprising a body enclosing a sealed cavity defined by a cavity wall;

at least one SAW device coupled with the cavity wall and having a frequency characteristic which varies with pressure externally applied on the sensor body;

wherein the cavity wall flanking the SAW device slopes away therefrom at an angle substantially greater than 90° in a plane transverse to the wave propagation direction of the device;

a well logging tool and means for mounting the sensor therein; and means for logging the pressure in a borehole with said tool and sensor.

* * * * *